United States Patent
Althaus et al.

[11] Patent Number: 6,059,463
[45] Date of Patent: May 9, 2000

[54] ELECTRO-OPTICAL DEVICE

[75] Inventors: Hans-Ludwig Althaus, Lappersdorf; Georg Bogner, Hainsacker; Joachim Krug, Neutraubling, all of Germany

[73] Assignee: Siemens Aktiengesellschaft, Munich, Germany

[21] Appl. No.: 09/161,556

[22] Filed: Sep. 25, 1998

Related U.S. Application Data

[63] Continuation of application No. PCT/DE97/00628, Mar. 27, 1997.

[30] Foreign Application Priority Data

Mar. 28, 1996 [DE] Germany .......................... 196 12 390

[51] Int. Cl.⁷ ...................................... G02B 6/36
[52] U.S. Cl. .............................................. 385/92
[58] Field of Search ........................................ 385/88–94

[56] References Cited

U.S. PATENT DOCUMENTS

| | | | |
|---|---|---|---|
| 5,119,462 | 6/1992 | Matsubara et al. | 385/93 |
| 5,631,990 | 5/1997 | Hashizume | 385/92 |
| 5,687,270 | 11/1997 | Takizawa | 385/94 |
| 5,751,874 | 5/1998 | Chudoba et al. | 385/92 |

FOREIGN PATENT DOCUMENTS

| | | |
|---|---|---|
| 0076514A2 | 4/1983 | European Pat. Off. |
| 0278507A2 | 8/1988 | European Pat. Off. |
| 0661565A1 | 7/1995 | European Pat. Off. |
| 8002368 | 6/1984 | Germany |
| 40214434C2 | 4/1993 | Germany |
| 3211792A1 | 11/1993 | Germany |
| 29503807 | 6/1995 | Germany |
| 19502264A1 | 7/1995 | Germany |
| 19515795A1 | 11/1995 | Germany |

OTHER PUBLICATIONS

Published International Application No. 94/12901 (Musk), dated Jun. 9, 1994.
Japanese Patent Abstract No. 59075210 (Masaru), dated Apr. 27, 1984.

*Primary Examiner*—Hung N. Ngo
*Attorney, Agent, or Firm*—Herbert L. Lerner; Laurence A. Greenberg; Werner H. Stemer

[57] ABSTRACT

The electro-optical device has a housing and an electro-optical composite component. The composite component has an electro-optical basic component, in particular a photodiode, a laser diode, or an LED, into which light can be injected and/or from which light can be emitted. In order to be able to manufacture the housing for the electro-optical basic component in the most cost-effective way possible, there is provided a guide sleeve for the electro-optical composite component. The guide sleeve is connected to the basic component and it guides a plug with a ferrule of an optical waveguide. When the ferrule is plugged into the guide sleeve, the optical waveguide is optically coupled to the basic component.

20 Claims, 4 Drawing Sheets

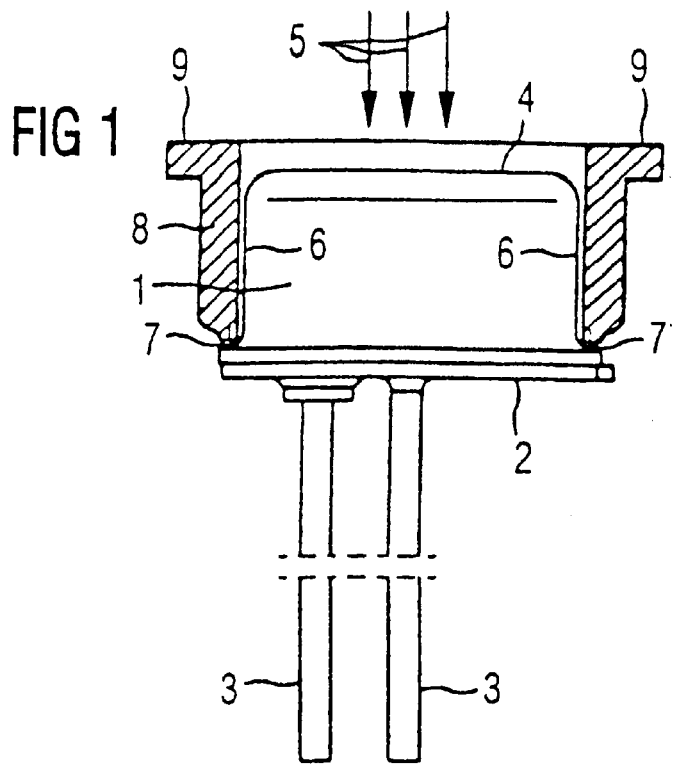
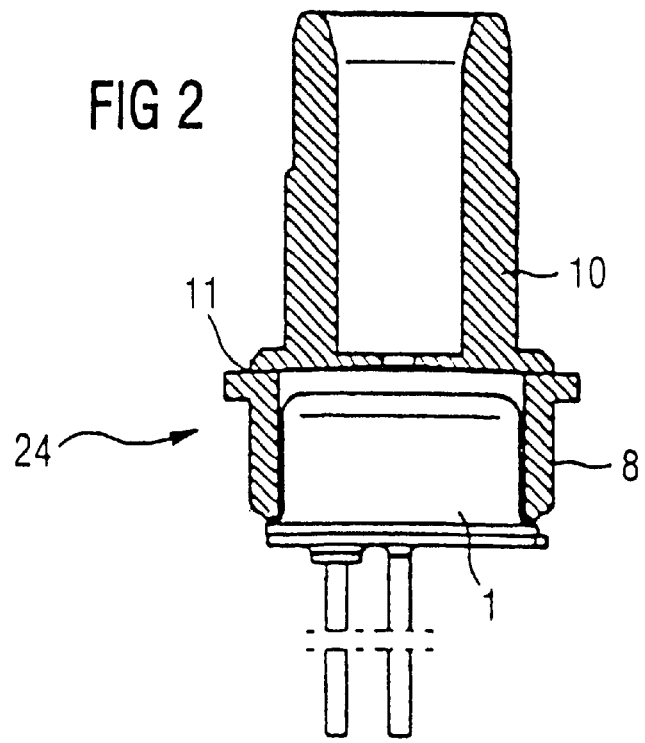

ELECTRO-OPTICAL DEVICE

CROSS-REFERENCE TO RELATED APPLICATION

This is a continuation of copending International Application PCT/DE97/00628, filed Mar. 27, 1997, which designated the United States.

BACKGROUND OF THE INVENTION

1. Field of the Invention

The present invention relates to an electro-optical device having a housing which has a plug receptacle for an optical waveguide plug and an electro-optical composite component which has an electro-optical basic component into which light can be injected or from which light can be extracted. The basic component has an upper side through which light can be injected into the basic component and/or extracted from the basic component. Side walls adjoin the upper side of the basic component and connect the upper side to an underside of the basic component. A guide sleeve for a ferrule of an optical waveguide plug is provided on the electro-optical basic component and is connected to the basic component in such a way that when the ferrule is plugged into the guide sleeve the optical waveguide is optically coupled to the basic component. The housing is fabricated separately from the electro-optical composite component and has, in addition to the plug receptacle, a composite component receptacle. The electro-optical composite component is mounted in the composite component receptacle in such a way that when the optical waveguide plug is plugged into the plug receptacle the ferrule is plugged into the guide sleeve.

Electro-optical basic components of the above type are generally known in the art. Virtually every commercially available photodiode or laser diode is designed in this way. The diodes are in widespread use in fiber-bound optical communications transmissions. In this respect, the diodes are installed in a housing, for example a so-called FC receptacle, which is an expensive stainless steel part that is manufactured by cutting. Arranged in the housing is a receptacle contour for a plug in accordance with the respective plug standard and a guide sleeve for the ferrule of the optical waveguide. The basic component is customarily aligned in the housing and fixed by means of laser welding. The housing must be of different design for the transmitter and receiver since the diodes have different shapes. Such electro-optical devices are known, for example, from U.S. Pat. No. 5,073,047 (German patent DE 40 21 434 C2), and from U.S. Pat. No. 4,875,752 (European EP 278 507 A2).

U.S. Pat. No. 5,577,145 (WO 94/12901) discloses an electro-optical device in which a slotted sleeve is plugged into a cylindrical tube of an electro-optical basic component. The problem with that device is that a separate alignment of the slotted sleeve which serves as a guide sleeve for a ferrule is not possible there because the cylindrical tube is formed in one piece with the basic component.

SUMMARY OF THE INVENTION

It is accordingly an object of the invention to provide an electro-optical device, which overcomes the above-mentioned disadvantages of the heretofore-known devices and methods of this general type and which renders available an electro-optical composite component the housing of which can be manufactured in the most cost-effective way possible. In particular, it is an object that, as far as receiving the composite component is concerned, the housing should be configured identically for all composite components. As far as the plug receptacle for the optical waveguide plug is concerned, the housing must, of course, continue to be configured in a plug-specific way.

With the foregoing and other objects in view there is provided, in accordance with the invention, an electro-optical device, comprising:

electro-optical composite component with an electro-optical basic component, the basic component having an upper side through which light can be injected into and extracted from the basic component, an underside, and side walls between the the upper side and the underside;

a guide sleeve for a ferrule of an optical waveguide plug disposed on and connected to the basic component such that, when the ferrule is plugged into the guide sleeve, the optical waveguide is optically coupled to the basic component;

a housing fabricated separately from the electro-optical composite component, the housing being formed with a plug receptacle for an optical waveguide plug and with a composite component receptacle;

the electro-optical composite component being mounted in the composite component receptacle such that, when the optical waveguide plug is plugged into the plug receptacle, the ferrule is plugged into the guide sleeve; and an alignment sleeve at least partially encapsulating the side walls of the basic component and connecting the guide sleeve to the basic component.

In other words, a guide sleeve is provided for the ferrule of the optical waveguide plug. The guide sleeve is attached to the electro-optical basic component in such a way that when the ferrule is plugged into the guide sleeve the optical waveguide is optically coupled to the basic component. The housing can thus be fabricated separately from the electro-optical composite component. The housing has, in addition to the plug receptacle, a composite component receptacle. The electro-optical composite component can be mounted in the composite component receptacle in such a way that when the optical waveguide plug is plugged into the plug receptacle the ferrule is plugged into the guide sleeve.

The external contour of the guide sleeve can thus be selected independently of the optical basic component. As a result, it is also possible, as far as receiving the composite component is concerned, for the housing to be configured identically for all the devices, such as for different diodes. In particular, identical housings may be used for the transmitter and receiver. In addition, the alignment of the ferrule with respect to the electro-optical basic component is also effected by means of the guide sleeve. Therefore, the housing no longer has to be a precision part. It can thus be manufactured more cost-effectively.

In accordance with an added feature of the invention, the guide sleeve has a flange formed on a side thereof directed toward the basic component. This leads to a greater surface of the attachment face. Consequently, there results, on the one hand, a more stable connection between the two elements and, on the other hand, extended alignment possibilities before the two elements are connected to one another.

In accordance with an additional feature of the invention, the guide sleeve, on a side thereof orientated toward the basic component, has a bottom formed with a substantially central drill hole. This advantageously results automatically in a defined stop for the ferrule.

In accordance with another feature of the invention, an internal element disposed inside the guide sleeve. The internal element may be composed of ceramic material or hard metal. With this embodiment. the ferrule can advantageously be guided more precisely in the guide sleeve. The guidance is particularly precise if the internal element is composed of ceramic material or a hard metal.

In accordance with a further feature of the invention, the basic component is formed with a contact face composed of a material having a given coefficient of expansion, the guide sleeve is connected to the contact face, and the guide sleeve is composed of a material having a substantially similar coefficient of expansion as the given coefficient of expansion of the contact face of the basic component. In particular, the guide sleeve is formed of the same material as the contact face of the basic component.

In accordance with again an added feature of the invention, the alignment sleeve is formed with a flange on a side thereof adjoining the guide sleeve. In a preferred embodiment, the guide sleeve is welded to the alignment sleeve.

In accordance with again an additional feature of the invention, the alignment sleeve is composed of a material having a coefficient of expansion substantially similar to a coefficient of expansion of a material of the contact face of the basic component. Particularly, the alignment sleeve is formed of the same material as the contact face of the basic component.

In accordance with again another feature of the invention, the guide sleeve is welded to the basic component.

If the guide sleeve is composed of a material which has a similar coefficient of expansion to the material of that part of the basic component which is in contact with the guide sleeve, or is composed of the same material as this part, mechanical stresses between the basic component and the guide sleeve which are due to temperature can advantageously be very largely eliminated.

It will be understood that the elements can be connected to one another in any desired fashion. However, the connection is particularly stable if the elements are welded to one another.

In accordance with again a further feature of the invention, the electro-optical composite component is formed with a collar and the housing is formed with a collar. When the composite component is disposed in the composite component receptacle of the housing, the collar of the composite component engages the collar of the housing, and the composite component is held in the composite component receptacle of the housing.

In accordance with yet a further feature of the invention, the composite component has an axis of symmetry, and the collar of the composite component is asymmetrical with respect to the axis of symmetry of the composite component. The composite component is thus retained in a nonrotatable fashion when the composite component is disposed in the composite component receptacle of the housing.

In accordance with a preferred embodiment, the collar of the housing is a sprung collar, and the collar of the composite component locks in the housing when the composite component is introduced into the composite component receptacle of the housing.

In accordance with a concomitant feature of the invention, the housing has a receptacle part and an attachment plate. The collar of the housing is thereby formed on the attachment plate, and the attachment plate is permanently joined to the receptacle part.

Other features which are considered as characteristic for the invention are set forth in the appended claims.

Although the invention is illustrated and described herein as embodied in an electro-optical device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a partly sectional view of a photodiode with an alignment sleeve;

FIG. 2 is a partly sectional view of a photodiode with an alignment sleeve and a guide sleeve;

DESCRIPTION OF THE PREFERRED EMBODIMENTS

Figure 3:
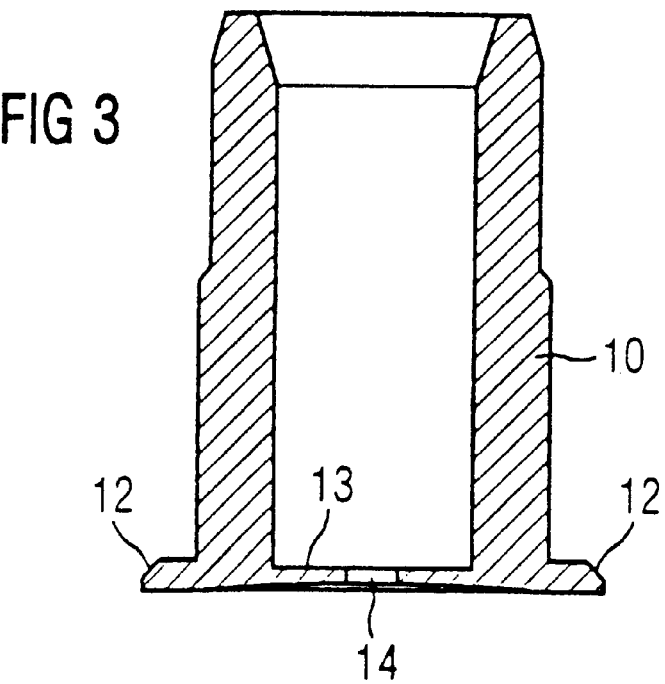
FIG. 3 is a sectional view of a guide sleeve.

Referring now to the figures of the drawing in detail and first, particularly, to FIG. 1 thereof, there is seen an electro-optical basic component 1 in the form of a photodiode. The photodiode 1 has an underside 2. The connecting wires 3 are arranged on the underside 2. The connecting wires 3 are used to make electrical connections with the photodiode 1. The upper side 4 lies opposite the underside 2. Light can be injected into the photodiode 1 at the upper side 4, as indicated by the arrows 5. Side walls 6 which connect the upper side 4 to the underside 2 adjoin the upper side 4. The side walls 6 of the photodiode 1 are composed of stainless steel. The photodiode 1 is connected to an alignment sleeve 8 via a weld seam 7. The points at which the weld seam 7 is in contact with the side walls 6 form the contact face of the basic component 1. The alignment sleeve 8 encapsulates the side walls 6 of the basic component 1 at least partially. In the exemplary embodiment the encapsulation is complete. It is likewise composed of stainless steel and has a flange 9 on its upper side.

With reference to FIG. 2, a guide sleeve 10 is attached to the alignment sleeve 8 by means of a weld seam 11 in such a way that as a result it is arranged above the upper side 4 of the photodiode 1. The guide sleeve 10 is also composed of stainless steel. As can also be seen in FIG. 2 and even more clearly in FIG. 3, the guide sleeve 10 also has a flange 12, specifically on its underside with which it is fitted onto the upper side of the alignment sleeve 8.

The flanges 9, 12 result in a stable connection between the sleeves 8, 10. Furthermore, the region within which the sleeves can be aligned relative to one another is enlarged.

Also with reference to FIG. 3, the guide sleeve 10 has a bottom 13 on its underside. A drilled hole 14 which is positioned essentially centrally is formed in the bottom 13 as a light exit opening. The drilled hole 14 has a diameter of approximately 1 mm.

A ferrule 25 of an optical waveguide 26 (see FIG. 5) can be plugged into the guide sleeve 10. The bottom 13 serves here as a stop for the ferrule 25. Forces are transmitted from the ferrule 25 to the photodiode 1 only via the weld seams 7, 11, but not directly onto the upper side 4. When it is plugged in through the guide sleeve 10, the ferrule 25 is guided in such a way that when the ferrule 25 is plugged into the guide sleeve 10 the optical waveguide 26 is optically coupled to the basic component 1. When the basic component 1 is implemented as a photodiode, light would therefore be injected from the optical waveguide 26 into the photodiode 1, for example. On the other hand, when the basic component 1 is implemented as a laser diode or LED, light would be injected from the basic component 1 into the optical waveguide 26.

Figure 4:
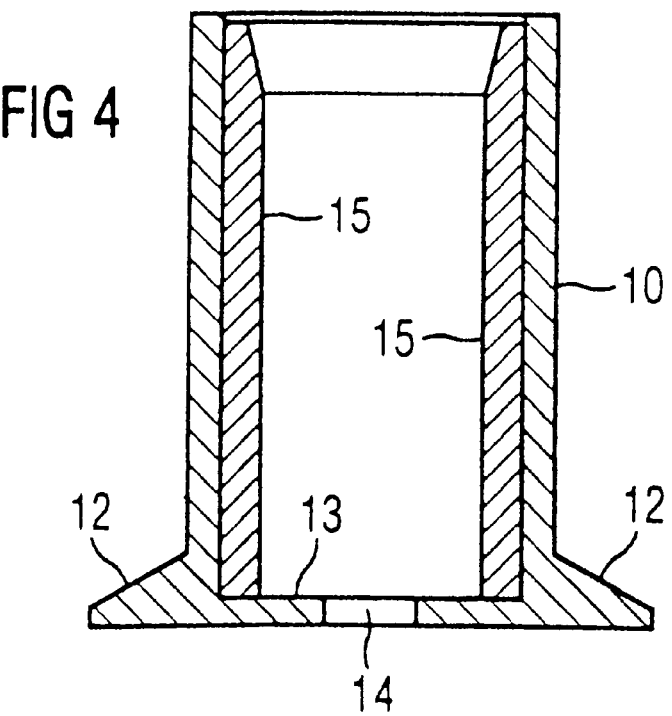
FIG. 4 is a sectional view of a guide sleeve with a ceramic material internal ring.

When the guide sleeve 10 is used in accordance with FIG. 3, an alignment accuracy of the ferrule 25 of 10 μm can be achieved. This accuracy is sufficient for photodiodes. On the other hand, for laser diodes a greater accuracy of 2 μm is often necessary. In order to obtain this alignment accuracy, the guide sleeve 10 illustrated in FIG. 4 can be used for laser diodes. In this guide sleeve 10, an internal ring 15 is arranged in the interior of the guide sleeve 10. The internal ring 15 is composed preferably of ceramic material or of a hard metal and is pressed into the guide sleeve 10. The pressing-in travel of the internal ring 15 is limited here by the bottom 13 of the guide sleeve 10.

The mounting of the basic element 1, alignment sleeve 8 and guide sleeve 9 is carried out as follows:

Firstly, the electro-optical basic component 1 is inserted into the alignment sleeve 8. Then, the alignment sleeve 8 and the basic component 1 are welded to one another, for example by means of resistance welding. The necessary alignment accuracy with this working procedure is not very high. In addition, the ferrule 25 of an optical waveguide 26 is plugged into the guide sleeve 10. Then, the guide sleeve 10 with ferrule 25 and the alignment sleeve 8 with basic component 1 are inserted into a so-called xyz manipulator. The z axis of the manipulator corresponds here to the axis of symmetry of the individual elements, that is to say of the electro-optical basic component 1, of the alignment sleeve 8 and of the guide sleeve 10.

Then, the alignment sleeve 8 together with the basic component 1, and the guide sleeve 10 together with the ferrule 25, are aligned with respect to one another in such a way that they directly adjoin one another in the z direction and are roughly aligned with one another in the xy plane. The necessary alignment accuracy is not very high in this step either.

Finally, the position of the alignment sleeve 8 together with the basic component 1 is no longer changed while the alignment sleeve 10 together with the ferrule 25 is made to pass through a specific region of the xy plane in submicrometer steps. At each position, the optical coupling between the basic component 1 and optical waveguide 26 is measured and stored. After all the points of the field have been passed through, the point is approached at which a maximum coupling has been produced. At this position, the guide sleeve 10 is then secured relative to the alignment sleeve 8 and welded to it, for example by means of laser welding.

This then concludes the manufacture of the electro-optical composite component 24. Finally, the ferrule 25 is merely pulled out of the guide sleeve 10 and the manufactured composite component 24 is removed from the manipulator. As a result, the composite component 24 is therefore electro-optically measured even before its installation in the housing 16. It is no longer necessary to perform a measurement after the installation.

Owing to the fact that the contact face of the electro-optical basic component 1, the alignment sleeve 8 and the guide sleeve 10 are all composed of stainless steel, no temperature-related stresses are produced along the weld seams 7, 11 even when there are changes in temperature. Instead of identical materials for the contact face of the electro-optical basic element 1, for the alignment sleeve 8 and for the guide sleeve 10, it would also be possible to use different materials. The decisive factor is that they can be connected to one another in a stable fashion and that they have similar or identical coefficients of expansion in order to avoid stresses due to temperature.

The composite component or assembly 24, composed of the basic component 1, the alignment sleeve 8 and the guide sleeve 10, can then be placed in a composite component receptacle 23 of a standardized housing 16. This is illustrated by way of example in FIGS. 5, 6 and 7 for a so-called FC receptacle and/or a so-called SC receptacle. In contrast to the previously used technology, the housings 16 no longer serve an alignment function but rather only a mounting function. For this reason, the housings 16 do not need to be precision elements. They can then be, for example, injection molded components made of plastic or metal, which can be manufactured cost-effectively.

Figure 5:
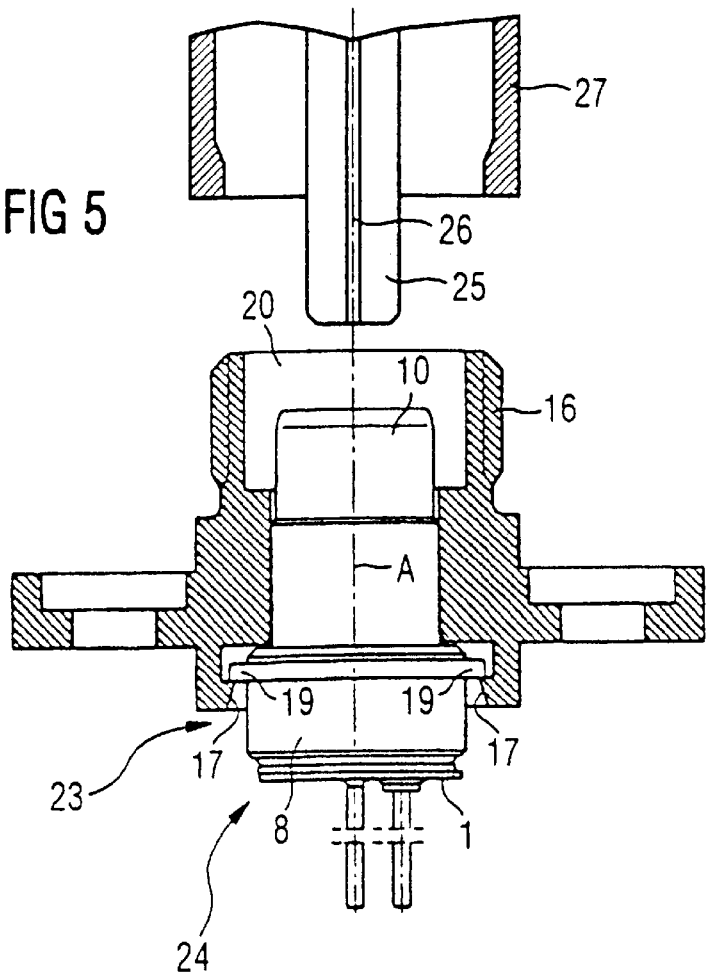
FIG. 5 is a partial sectional view of an electro-optical composite component installed in an FC receptacle.

With specific reference to FIG. 5, the housing 16 has a circumferential, sprung locking projection or collar 17 so that the composite component 24 locks in the housing 16 when it is introduced into the composite component receptacle 23. The collar 17 of the housing 16 engages here in the collar 19 of the composite component 24, so that the composite component 24 is held in a stable fashion in the housing 16 as a result of the collars 17, 19 engaging in one another. In the most favorable case, this obviates the need for any other attachment of the composite component 24 (for example by soldering, welding, bonding, . . . ).

If the collars 17, 19 are of asymmetrical design with respect to the axis of symmetry A, the composite component 24 is held in a nonrotatable fashion in the housing 16. The asymmetries may be implemented, for example, as oval projections, as notches or as elevations or flattened portions.

Figure 6:
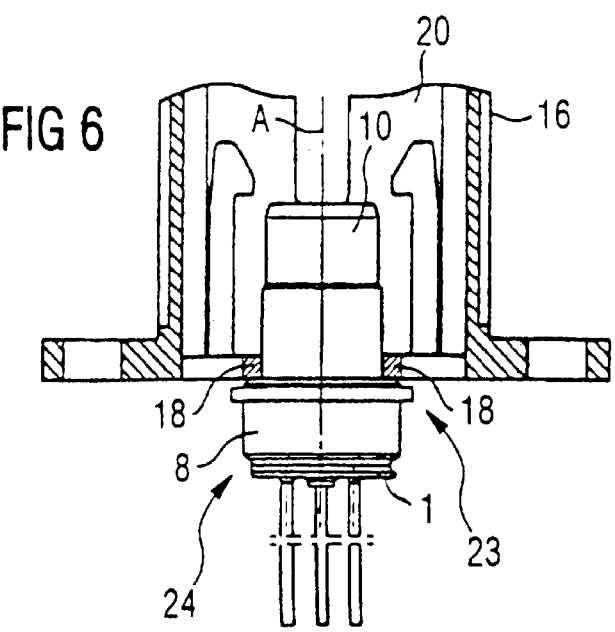
FIGS. 6 and 7 are sectional view each showing a composite component installed in an SC receptacle.

As an alternative to locking, the composite component 24 could, for example, also be screwed in or, as illustrated in FIG. 6, bonded to the housing 16 along the circular ring 18. The locking of the composite component 24 by means of the locking projection 17 is, however, structurally particularly simple and very stable. It is therefore to be preferred if possible.

Figure 7:
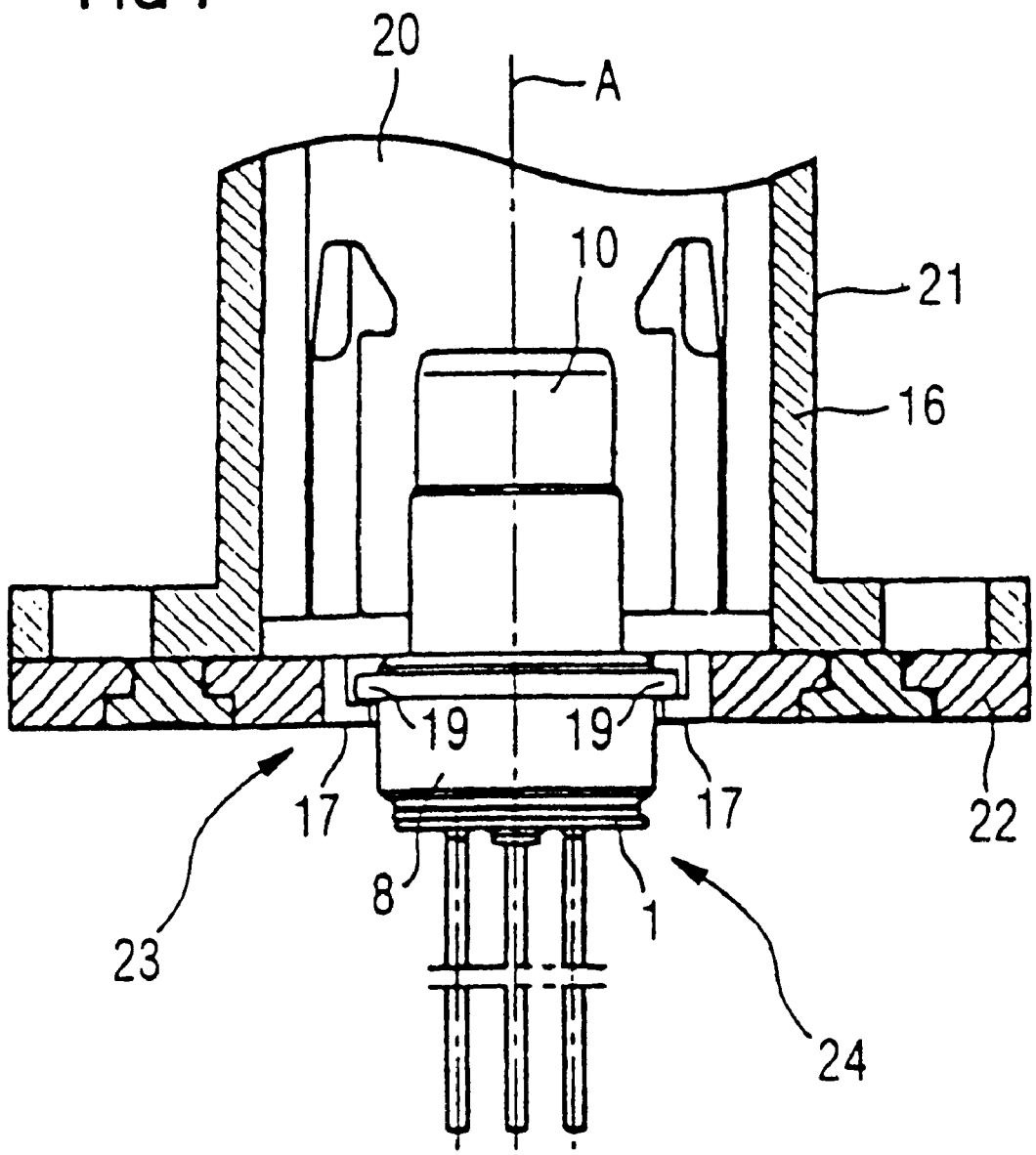

FIG. 7 illustrates a further advantageous embodiment of the housing 16. In this embodiment, the housing 16 is composed of a receptacle part 21 and an attachment plate 22. The receptacle part 21 contains a plug receptacle 20 and the composite component receptacle 23. On the other hand, the attachment plate 22 covers the composite component receptacle 23. The collar 17, which holds the composite component 24, is arranged on the attachment plate 22. The attachment plate 22 is, for example, bolted or bonded to the receptacle part 21.

Apart from the composite component receptacle 23, the housing 16 also has a plug receptacle 20 (FIG. 5 to FIG. 7). A plug 27 of an optical waveguide 26, which is provided with a ferrule 25, can be plugged into the plug receptacle 20. The plug receptacle 20 is designed in accordance with the desired plug standard (FC, SC, . . . ). The composite component receptacle 23 and the plug receptacle 20 are arranged in such a way that the ferrule 25 is plugged into the guide sleeve 10, and the optical waveguide 26 is thus optically coupled to the basic component 1 if both the composite component 24 and the optical waveguide plug 27 are arranged in the housing 16.

In accordance with the exemplary embodiment described above, the basic component 1 and the guide sleeve 10 are connected to one another indirectly by means of the alignment sleeve 8. The guide sleeve 10 and the basic component 1 could, however, also be connected to one another directly or by means of one or more intermediate elements.

We claim:

1. An electro-optical device, comprising:

an electro-optical composite component with an electro-optical basic component, said basic component having an upper side through which light can be injected into and extracted from said basic component, an underside, and side walls between said upper side and said underside;

a guide sleeve for a ferrule of an optical waveguide plug disposed on and connected to said basic component such that, when the ferrule is plugged into said guide sleeve, the optical waveguide is optically coupled to said basic component, said guide sleeve having a flange formed on a side thereof directed toward said basic component;

a housing fabricated separately from said electro-optical composite component, said housing being formed with a plug receptacle for an optical waveguide plug and with a composite component receptacle;

said electro-optical composite component being mounted in said composite component receptacle such that, when the optical waveguide plug is plugged into the plug receptacle, the ferrule is plugged into said guide sleeve; and an alignment sleeve at least partially encapsulating said side walls of said basic component and connecting said guide sleeve to said basic component.

2. The electro-optical device according to claim 1, wherein said basic component is formed with a contact face composed of a material having a given coefficient of expansion, said guide sleeve is connected to said contact face, and said guide sleeve is composed of a material having a substantially similar coefficient of expansion to the given coefficient of expansion of said contact face of said basic component.

3. The electro-optical device according to claim 2, wherein said guide sleeve is formed of the same material as said contact face of said basic component.

4. The electro-optical device according to claim 1, wherein said alignment sleeve is formed with a flange on a side thereof adjoining said guide sleeve.

5. The electro-optical device according to claim 4, wherein said guide sleeve is welded to said alignment sleeve.

6. The electro-optical device according to claim 1, wherein said alignment sleeve is composed of a material having a coefficient of expansion substantially similar to a coefficient of expansion of a material of said contact face of said basic component.

7. The electro-optical device according to claim 6, wherein said alignment sleeve is formed of the same material as said contact face of said basic component.

8. The electro-optical device according to claim 1, wherein said guide sleeve is welded to said basic component.

9. The electro-optical device according to claim 1, wherein said electro-optical composite component is formed with a collar and said housing is formed with a collar such that, when said composite component is disposed in said composite component receptacle of said housing, said collar of said composite component engages said collar of said housing, and said composite component is held in said composite component receptacle of said housing.

10. The electro-optical device according to claim 9, wherein said composite component has an axis of symmetry, and said collar of said composite component is asymmetrical with respect to the axis of symmetry of said composite component, such that said composite component is retained in a nonrotatable fashion when said composite component is disposed in said composite component receptacle of said housing.

11. The electro-optical device according to claim 10, wherein said collar of said housing is a sprung collar, and said collar of said composite component locks in said housing when said composite component is introduced into said composite component receptacle of said housing.

12. The electro-optical device according to claim 9, wherein said collar of said housing is a sprung collar, and said collar of said composite component snaps to lock in said housing when said composite component is introduced into said composite component receptacle of said housing.

13. The electro-optical device according to claim 9, wherein said housing has a receptacle part and an attachment plate, said collar of said housing is formed on said attachment plate, and said attachment plate is permanently joined to said receptacle part.

14. An electro-optical device, comprising:

an electro-optical composite component with an electro-optical basic component, said basic component having an upper side through which light can be injected into and extracted from said basic component, an underside, and side walls between said upper side and said underside;

a guide sleeve for a ferrule of an optical waveguide plug disposed on and connected to said basic component such that, when the ferrule is plugged into said guide sleeve, the optical waveguide is optically coupled to said basic component, said guide sleeve, on a side thereof orientated toward said basic component, having a bottom formed with a substantially central drill hole;

a housing fabricated separately from said electro-optical composite component, said housing being formed with a plug receptacle for an optical waveguide plug and with a composite component receptacle;

said electro-optical composite component being mounted in said composite component receptacle such that, when the optical waveguide plug is plugged into the plug receptacle, the ferrule is plugged into said guide sleeve; and an alignment sleeve at least partially encapsulating said side walls of said basic component and connecting said guide sleeve to said basic component.

15. The electro-optical device according to claim 14, wherein said basic component is formed with a contact face composed of a material having a given coefficient of expansion, said guide sleeve is connected to said contact face, and said guide sleeve is composed of a material having a substantially similar coefficient of expansion to the given coefficient of expansion of said contact face of said basic component.

16. The electro-optical device according to claim 14, wherein said alignment sleeve is formed with a flange on a side thereof adjoining said guide sleeve.

17. The electro-optical device according to claim 14, wherein said alignment sleeve is composed of a material having a coefficient of expansion substantially similar to a coefficient of expansion of a material of said contact face of said basic component.

18. An electro-optical device, comprising:

an electro-optical composite component with an electro-optical basic component, said basic component having an upper side through which light can be injected into and extracted from said basic component, an underside, and side walls between said upper side and said underside;

a guide sleeve for a ferrule of an optical waveguide plug disposed on and connected to said basic component such that, when the ferrule is plugged into said guide sleeve, the optical waveguide is optically coupled to said basic component;

a housing fabricated separately from said electro-optical composite component, said housing being formed with a plug receptacle for an optical waveguide plug and with a composite component receptacle;

said electro-optical composite component being mounted in said composite component receptacle such that, when the optical waveguide plug is plugged into the plug receptacle, the ferrule is plugged into said guide sleeve;

an alignment sleeve at least partially encapsulating said side walls of said basic component and connecting said guide sleeve to said basic component; and an internal element disposed inside said guide sleeve and composed of a material selected from the group consisting of ceramic material and hard metal.

19. The electro-optical device according to claim 18, wherein said basic component is formed with a contact face composed of a material having a given coefficient of expansion, said guide sleeve is connected to said contact face, and said guide sleeve is composed of a material having a substantially similar coefficient of expansion to the given coefficient of expansion of said contact face of said basic component.

20. The electro-optical device according to claim 18, wherein said alignment sleeve is formed with a flange on a side thereof adjoining said guide sleeve.

* * * * *